United States Patent [19]

Ido et al.

[11] 4,254,368
[45] Mar. 3, 1981

[54] APPARATUS FOR DRIVING A MOTOR

[75] Inventors: Satoshi Ido, Tokorozawa; Nobuo Hamamoto; Kazuo Ichino, both of Tokyo, all of Japan

[73] Assignees: Nippon Telegraph and Telephone Public Corporation; Hitachi, Ltd., both of Japan

[21] Appl. No.: 112,747

[22] Filed: Jan. 17, 1980

[30] Foreign Application Priority Data

Jan. 29, 1979 [JP] Japan .................................. 54/8232

[51] Int. Cl.³ .............................................. H02P 5/16
[52] U.S. Cl. .................................. 318/603; 318/685; 318/341
[58] Field of Search ............... 318/341, 603, 685, 696, 318/561

[56] References Cited

U.S. PATENT DOCUMENTS

| | | | |
|---|---|---|---|
| 3,950,682 | 4/1976 | Dohanich | 318/341 |
| 4,054,820 | 10/1977 | Foster | 318/341 |
| 4,066,941 | 1/1978 | Foster | 318/603 X |
| 4,143,310 | 3/1979 | Fujinawa et al. | 318/603 X |

Primary Examiner—B. Dobeck
Attorney, Agent, or Firm—Craig & Antonelli

[57] ABSTRACT

In an apparatus for driving a motor wherein a carrier or stage carrying a sample thereon is located and moved to a predetermined position by controlling the slow-up and slow-down speed of the motor at the start and prior to the stopping thereof, respectively, this invention provides for speed control of the motor in accordance with a function of arbitrary characteristic slope, the function being stored in the form of a succession of digital values which may be sequentially accessed by a counter control circuit responsive to a control command signal representing the on-off condition for the motor.

7 Claims, 4 Drawing Figures

APPARATUS FOR DRIVING A MOTOR

BACKGROUND OF THE INVENTION

This invention relates to an apparatus for driving a motor for quickly and accurately locating (moving) a carrier or stage which is used, for example, in an apparatus for electron beam lithography and on which a sample (mask or wafer) is carried to a predetermined position.

In order to move the carrier or stage in a short time, high-speed pulses may be fed to a pulse motor driver which controls the motor coupled to the stage. However, when high-speed pulses at or above the self-start frequency of the pulse motor are suddenly applied to the driver, the motor operation becomes disordered to cause run-out or is subject to a start-stop (stuttering) operation with error or becomes out of control and does not rotate in spite of the injection of pulse current thereto in relation to the load torque. It is therefore common practice to use a so-called slow-up and slow-down system of starting and stopping in which the speed is gradually raised and lowered at start and prior to stop, respectively.

Heretofore, speed control has been effected in accordance with a selected linear function for the slow-up or slow-down operation. It has been empirically known, however, that the linear function cannot have an optimum shape for a moving mechanism, including the motor. Moreover, even when a linear function is utilized, there are limits imposed by the starting characteristics of the pulse motor itself, the magnitude of the load torque, etc., and a gradient at or above the speed at which run-out is incurred cannot be set. The prior art has been subject to such disadvantages, without being successful in rendering the speed of the carrier or stage movement higher.

SUMMARY OF THE INVENTION

This invention has been made with a view toward solving the above-mentioned problems in the prior art, and has for its object to provide a motor driving system wherein the slow-up and slow-down operations stated above are controlled by functions having an arbitrary characteristics, thereby making it possible to render the speed of the stage movement high, without the attendant disadvantages previously encountered.

In order to accomplish this object, the present invention provides an apparatus for driving a motor wherein a carrier or stage carrying a sample thereon is located and moved to a pre-determined position by controlling the speed of the slow-up and slow-down operations at start and prior to stop of the motor, respectively, in accordance with a function having an arbitrary characteristic. The system includes circuit means to provide a control command signal shorter than a preset stage movement command signal by a slow-down time interval and a clock signal for determining slow-up and slow-down times, counting means to count in an "up" direction at a logical "1" level and in a "down" direction at a logical "0" level, first gate circuit means to form on the basis of said control command signal and said clock signal a pulse train signal with which the content of said counting means is held at all "1" when said control command signal is of logic "1" and the content of said counting means is held at all "0" when said control command signal is of logic "0", memory means responsive to the output signal of the counting means in the form of an address for reading out digital speed command signals in accordance with a function of arbitrary characteristic stored in correspondence with the address in advance, converting means to subject the speed command signals to digital-to-analog conversion into an analog signal and further subject the analog signal to voltage-to-frequency conversion so as to form a pulse train signal, second gate circuit means to execute a logical AND operation between this pulse train signal and a stage movement command signal, and driving means to drive the motor with an output signal obtained by the logical AND operation.

DETAILED DESCRIPTION OF THE PREFERRED EMBODIMENTS

Hereunder, this invention will be described with reference to various preferred embodiments.

Figure 1:
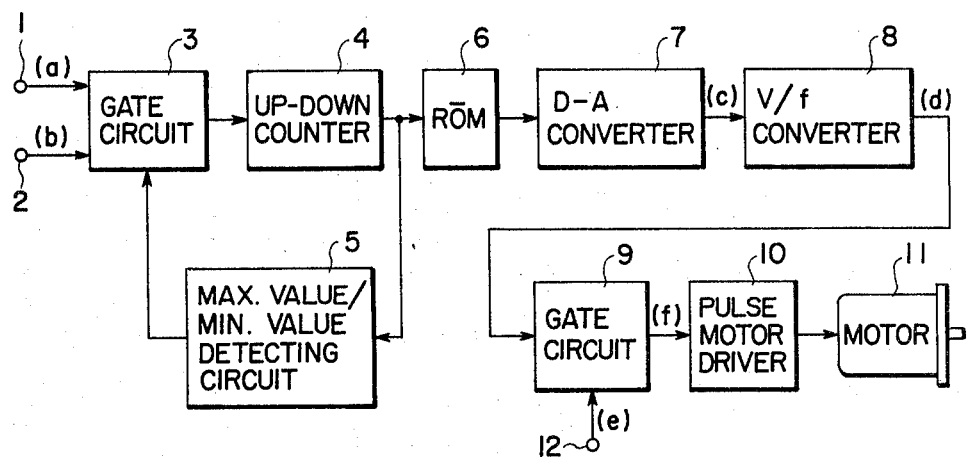
FIG. 1 is a block diagram showing an embodiment of this invention.
Figure 2:
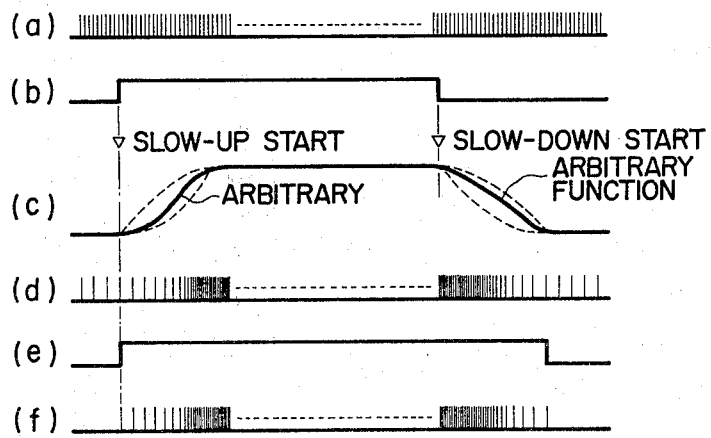
FIG. 2 is a waveform diagram showing signal waveforms in various portions of the embodiment of FIG. 1.

FIG. 1 is a block diagram showing an embodiment of this invention, while FIG. 2 shows signal waveforms in various portions thereof. Referring to the figures, a clock signal 1, represented by the signal waveform at (a) in FIG. 2, serves to determine slow-up and slow-down times. From the clock signal 1 there is formed a control command signal 2, represented by the signal waveform at (b) in FIG. 2, in synchronism with a movement command signal 12, represented by the signal waveform at (e) in FIG. 2, and the signals 1 and 2 are applied to a gate circuit 3. A motor 11 is operated in accordance with a speed control signal applied to gate 9 while the movement command signal 12 is at the logical "1" level. The control command signal 2 forms, by means of the gate circuit 3 and a maximum value/minimum value detecting circuit 5, a pulse train signal which operates an up/down counter 4 in the "up" direction at the logical "1" level and in the "down" direction at the logical "0" level of the signal 2. More specifically, when the logic level of the control command signal 2 has become "1", the clock pulses 1 are counted to rectilinearly increase the content of the up/down counter 4 until the content of the counter becomes all "1" (maximum value). Upon arrival at the maximum value, this state is continued unless the logic level of the control command signal 2 changes to the "0" level. Subsequently, when the logic level of the control command signal 2 has become "0", the clock pulses 1 are counted until the content of the up/down counter 4 becomes all "0" (minimum value), at which time the operation ceases.

In order to perform speed in accordance with an arbitrary function, the output signal of the up/down counter is applied as an address to a read only memory ROM 6, and the function data in digital form stored at the memory location corresponding to the address is fetched and is turned into an analog signal, represented by the signal waveform at (c) in FIG. 2, by means of a D-A (digital-to-analog) converter 7. This signal is converted into a pulse train signal, represented by the signal waveform at (d) in FIG. 2, by means of a V/f converter (voltage-to-frequency converter) 8 of excellent linearity. The pulse train signal is subjected to an AND operation with the movement command signal 12 in a gate circuit 9. Using the resultant output signal, represented by the signal waveform at (f) in FIG. 2, the pulse motor 11 is driven through a pulse motor driver 10.

Figure 3:
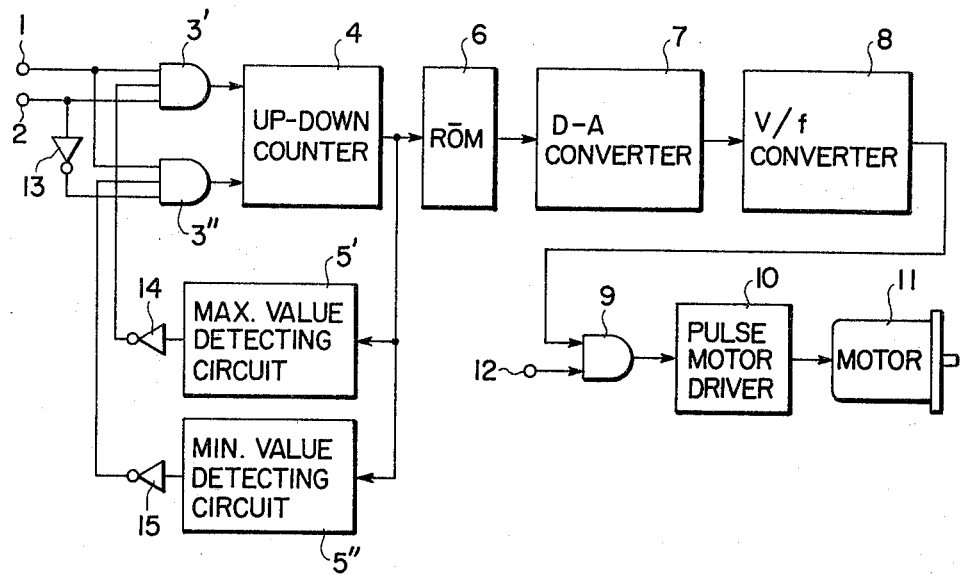
FIG. 3 is a block diagram showing a specific example of the embodiment of this invention.

FIG. 3 is a block diagram showing a specific example of an embodiment of this invention. In the initial stop state, the control command signal 2 is "0", and the outut of an inverter 13 accordingly becomes "1", so that a gate 3" is enabled to cause the up/down counter 4 to count the clock pulses in the "down" direction. When the output of the up/down counter 4 has become all "0", the output of all "0" detecting circuit (or minimum value detecting circuit) 5" becomes "1", and the output of an inverter 15 becomes "0", so that the gate 3" is disabled.

It will be noted that the control command signal 2 being of shorter duration than the movement command signal 12 (the motor operates while this signal 12 is of logical "1" value) by a time interval in which the maximum speed lowers down to the stop state. When, under such stop state, the control command signal 2 is received, a gate 3' is enabled, the gate 3" being disabled up to this time, and the up/down counter 4 increases its content rectilinearly in the "up" direction by counting the clock pulses. When the output of an all "1" detecting circuit (maximum value detecting circuit) 5' has become "1", the output of an inverter 14 becomes "0" to disable the gate 3". That is, the up/down counter 4 has its operation stopped with its content indicating the maximum value. This stage under which the carrier or stage being driven moves at the maximum speed is continued unless the control command signal 2 is switched to the "0" level.

Subsequently, when the carrier or stage has come to the vicinity of a set point, the control command signal 2 previously set to be shorter by the slow-down time interval is reset and changes to the "0" level. At this time, the movement command signal 12 remains at the "1" level. As a result, the output of the inverter 13 changes to the "1" level to enable the gate 3". In this case, the output of the inverter 15 is at the "1" level unless the output of the all "0" detecting circuit 5" becomes "1", and the content of the up/down counter 4 decreases rectilinearly in the "down" direction. When the output of the all "0" detecting circuit has become "1", that is, when the output of the up/down counter 4 has become all "0", the gate 3" is also disabled.

In order to perform speed control in accordance with an arbitrary function, the output signal of the counter 4 is given as an address for the ROM 6, and the function data in digital form stored in a location corresponding to the address is fetched and is subjected to a D-A conversion by means of the D-A converter 7. Function data corresponding to addresses is set and stored in the ROM 6 in advance. The analog output signal of converter 7 is applied to the V/f converter (voltage-to-frequency converter) 8 of excellent linearity so as to form a pulse train signal, which is applied to one input terminal of the gate 9. When the movement command signal 12 is applied to the other input terminal of the gate 9, the pulse motor drive signal as shown at (f) in FIG. 2 is obtained.

Figure 4:
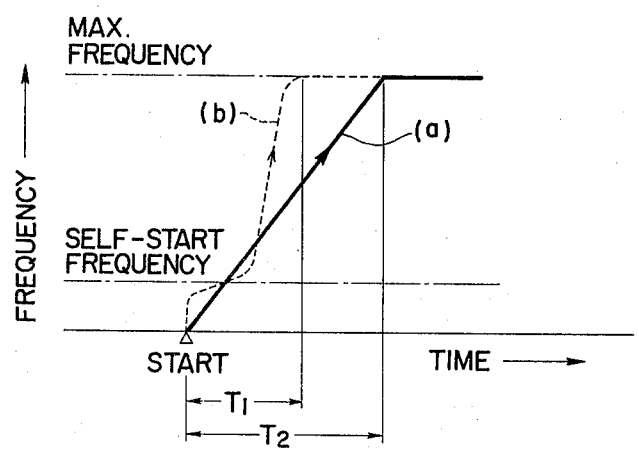
FIG. 4 is a characteristic diagram for explaining an example of the slow-up of stage movement.

Fig. 4 shows an example of a function of selected characteristic shape for the slow-up or slow-down operations performed in the foregoing embodiments. As stated previously, in general, the pulse motor causes run-out and does not start unless the driving frequency is below the self-start frequency. The proportion of a variation versus time (speed variation) at the time when the self-start frequency is crossed is the main factor for causing the run-out, and dominates the gradient speed. In this regard, the prior art has adopted a linear function for speed control as stated before and as indicated by the characteristic (a) in FIG. 4, and has therefore evaluated experimentally the gradient speed occurring when no run-out is incurred, the maximum frequency (maximum speed) being reached with the gradient. In contrast, according to this invention, the function having a shape as shown by way of example at (b) in FIG. 4 is adopted for the slow-up operation of the motor. It has thus been possible to sharply shorten the period of time in which the maximum speed is reached, in comparison with that in the prior art.

Although the figure only exemplifies the characteristic curve for the slow-up operation, the situation for the slow-down operation is similar. Hereunder, the operation at slow-up will be taken as an example and described.

Referring to the figure, the profile of the function is that upon a start command, the driving frequency is abruptly raised to a value which is 20-30% this side of the self-start frequency, usually 2 kpps (kilo-pulses per second) in a high-speed pulse motor, that a gentle slope is thereafter given till a point of time at which the self-start frequency has been crossed and exceeded 20-30%, to reliably prevent the run-out, and that an abrupt rising is thereafter given again, to quickly reach the maximum speed. Also, in the vicinity of the maximum frequency, for example, 10 kpps in the foregoing embodiments, a sudden speed variation as in the prior art is not set, but a slow speed variation as in the figure is given. Thus, it has been made possible to reduce the vibrations of the stage and to move the stage smoothly. In this example, the period of time from the start to the arrival at the maximum frequency is 30 ms ($=T_1$) in case of this invention. In view of the corresponding period of time of 80 ms ($=T_2$) in the prior art, it has become possible to sharply shorten the period of time or raise the speed of the stage movement.

The curves and numerical values for the slow-up and slow-down operations in accordance with this invention as used in the above description are not restricted to the examples referred to, but can be appropriately selected. In this manner, the optimum curves of the slow-up and slow-down operations and the starting point of the slow-down operation are greatly different depending upon the structure of a mechanism portion on the drive side, load characteristics, the electrical characteristics of the motor and driver, etc. In accordance with this invention, however, merely by rewriting the content of the ROM into functions having suitable characteristic shapes, the pulse motor drive which is of course free of run-out can be realized with simple construction and at low cost without incurring any increase in the locating time (moving time) of the carrier or stage. In addition, the driving apparatus is applicable, not only to the pulse motor, but also to various other kinds of motors. This invention has such great effects in practical use.

While we have shown and described various embodiments in accordance with the present invention, it is to be understood that the same is not limited thereto but is susceptible of numerous changes and modifications as are obvious to those of ordinary skill in the art, and we therefore do not wish to be limited to the details shown and described herein but intend to cover all such changes and modifications as are obvious to one skilled in the art.

What is claimed is:

1. In an apparatus for driving a motor wherein a stage carrying a sample thereon is located and moved to a predetermined position in accordance with a selected speed characteristic including a function for slow-up and slow-down of the speed at the start and prior to the stopping of the motor, respectively, the improvement comprising:

circuit means to provide a preset stage movement command signal, a control command signal shorter than said preset stage movement command signal by a predetermined slow-down time interval and a clock signal for determining slow-up and slow-down times;

counting means responsive to said control command signal and said clock signal for counting in an "up" direction at a logical "1" level of said control command signal and in a "down" direction at a logical "0" level of said control command signal to produce a sequence of address signals;

memory means for storing a speed control function of arbitrary characteristic shape in the form of a succession of digital values and for reading out said values in response to the output address signals of said counting means;

converting means for converting the digital output of said memory means to a pulse train signal whose frequency varies in accordance with the digital values;

gate circuit means for effecting an AND operation between said pulse train signal and said stage movement command signal; and driving means to drive said motor with an output signal obtained by said AND operation.

2. An apparatus for driving a motor according to claim 1, wherein said motor is a pulse motor.

3. An apparatus for driving a motor according to claim 2, wherein digital values representing said function stored in said memory means vary in value so as to produce a driving frequency which has an abrupt slope from a time corresponding to the zero frequency, which has a gentle slope in the vicinity of a self-start frequency of said pulse motor before and after arrival at said self-start frequency, which thereafter rises abruptly again, and which has a gentle slope in the vicinity of a maximum frequency before arrival at said maximum frequency.

4. An apparatus for driving a motor according to claims 1 or 3, wherein said memory means comprises a read only memory.

5. An apparatus for driving a motor according to claims 1 or 3, wherein said counting means comprises an up/down counter.

6. An apparatus for driving a motor according to claims 1 or 3, wherein said converting means comprises a digital-to-analog converter connected in series with a voltage-to-frequency converter.

7. An apparatus for driving a motor according to claims 1 or 3, wherein said counting means comprises an up-down counter, detecting means for detecting the maximum value count and minimum value count of said up-down counter, and additional gate circuit means for applying said clock signal to drive said up-down counter in the "up" direction until said maximum value count is detected by said detecting means and for applying said clock signal to drive said up-down counter in the "down" direction until said minimum value count is detected by said detecting means.

* * * * *